United States Patent [19]

Auracher et al.

[11] Patent Number: 4,829,598
[45] Date of Patent: May 9, 1989

[54] OPTICAL RECEIVER WITH AN OPTICAL COUPLER AND AN ELECTRONIC AMPLIFIER

[75] Inventors: Franz Auracher, Baierbrunn; Goetz Berenbrock; Bernd Schlemmer, both of Gevelsberg, all of Fed. Rep. of Germany

[73] Assignee: Siemens Aktiengesellschaft, Berlin and Munich, Fed. Rep. of Germany

[21] Appl. No.: 137,966

[22] Filed: Dec. 28, 1987

[30] Foreign Application Priority Data

Jan. 22, 1987 [DE] Fed. Rep. of Germany ....... 3701793

[51] Int. Cl.$^4$ ............................................. H04B 9/00
[52] U.S. Cl. .................................. 455/619; 455/612; 455/617
[58] Field of Search ............... 455/606, 607, 612, 616, 455/617, 619

[56] References Cited

U.S. PATENT DOCUMENTS 4,718,120   1/1988   Tzeng ................................. 455/619

FOREIGN PATENT DOCUMENTS 0250819   1/1988   European Pat. Off. ............ 455/616
0251062   1/1988   European Pat. Off. ............ 455/619

OTHER PUBLICATIONS

Journal of Optical Communications, "Optical PCM Clock Regenerator with Integrated Optical Directional Coupler", Schlaak, Mar. 1982, pp. 31–34.
Hodgkinson et al., "Demodulation of Optical DPSK Using IN-Phase and Quadrature Detection", Electronics Letters, vol. 21, No. 19, Sep. 12, 1985, pp. 867–868.
Leeb, "Realization of 90°- and 180° Hydribs for Optical Frequencies", AEU, vol. 37, No. 5/6, 1983, pp. 203–306.
Stowe, "TUB5 Passive Quadrature Demodulation for Interferometric Sensors", Optical Fiber Conference-'83, New Orleans, Mar. 1, 1983, pp. 38–40.
IEEE, Electronics Division Colloquim, "Advances in Coherent Optic Devices and Technologies", Mar. 26, 1985, Digest No. 1985/30.
Kazovsky, "ASK Multiport Optical Homodyne Receivers", ECOC 1986, pp. 395–398.
Kazovsky, "Decision-Driven Phase-Locked Loop for Optical Homodyne Receivers: Performance Analysis and Laser Linewidth Requirements", Journal of Lightwave Tech., vol. LT-3, No. 6, pp. 1238–1247, Dec. 1985.
Abbas, "A Dual-Detector Optical Heterodyne Receiver for Local Oscillator Noise Suppression", Journal of Lightwave Tech., vol. LT-3, No. 5, Oct., 1985, pp. 1110–1122.
Neyer et al., "A Beam Propagation Method Analysis of Active and Passive Waveguide Crossings", Journal of Lightwave Tech., vol. LT-3, No. 3, Jun. 1985, pp. 635–642.

Primary Examiner—Robert L. Griffin
Assistant Examiner—L. Van Beek
Attorney, Agent, or Firm—Hill, Van Santen, Steadman & Simpson

[57] ABSTRACT

An optical receiver has an optical coupler means manufactured in integrated waveguide technology in the form of an optical 90 degree hybrid element which is preferably adjustable with a phase control. Also included is an electronic amplifier portion in the form of a balanced receiver. In one embodiment superheterodyne optical reception is provided.

22 Claims, 2 Drawing Sheets

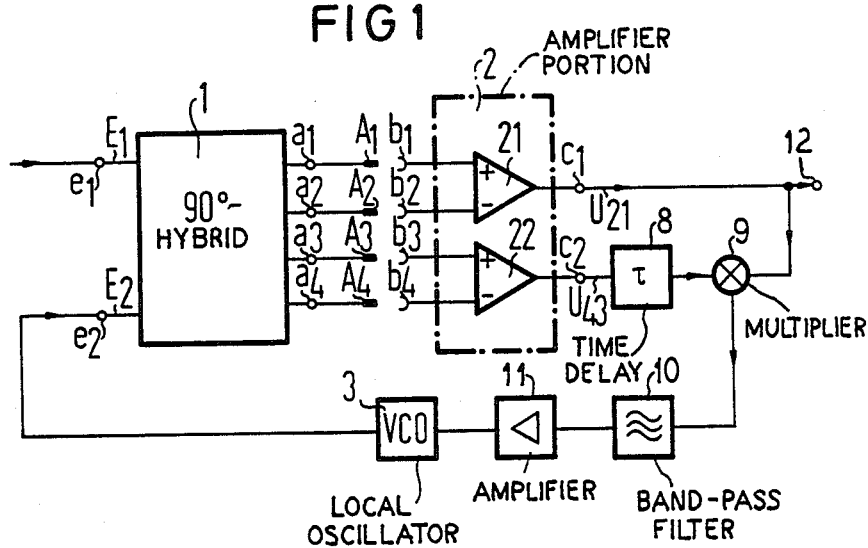
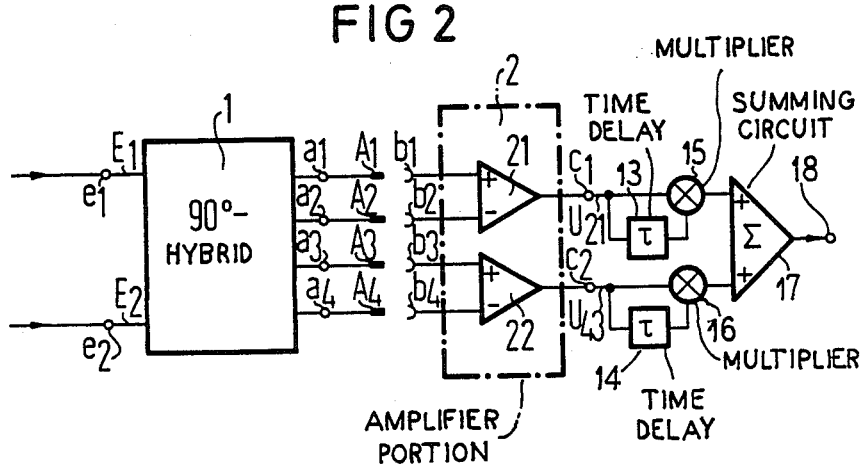

OPTICAL RECEIVER WITH AN OPTICAL COUPLER AND AN ELECTRONIC AMPLIFIER

BACKGROUND OF THE INVENTION 1. field of the Invention

The present invention relates generally to an optical receiver including an optical coupler for mixing two signals and an electronic amplifier.

2. Description of the Related Art

An optical receiver is disclosed in IEE Colloquium on Advances in Coherent Optic Devices and Technologies, Savoy Place, London, Great Britain, March 1985 and in ECOC 1986, pages 395–398. Each of these disclosures shows an optical ASK multiport homodyne receiver wherein a transmission signal and an oscillator signal are brought together in a 3×3 optical coupler. Different, relative phase shifts of the two incident signals are available at the outputs of the optical coupler. The relative phase difference between the three mixed signal components which can be taken from the 3×3 coupler must respectively amount to 120 degrees, and in addition, the disclosed coupler is not easy to manufacture. The three mixed signal components are conducted to three separate amplifiers in an electronic amplifier portion.

Homodyne receivers as shown in Journal of Lightwave Technology, LT-3, 1985, pages 1238–1247, and multiport receivers as disclosed in Electronics Letters 21, 1985, pages 867–868 can be advantageously constructed, for example, with what are referred to as 90 degree hybrids. Optical hybrids for free beam propagation are known from AEU 37, 1983, pages 203–206 wherein a 90 degree shift of two orthogonal field strength components of a circularly polarized light source is exploited. In superheterodyne receivers for lightwave guide heterodyne systems, however, it is desirable to execute all optical components in wave guide technology.

A 90 degree hybrid is realized with four fiber directional couplers connected to one another and with a phase shifter as disclosed in the D. W. Stowe paper TUB 5, OFC-83, New Orleans.

SUMMARY OF THE INVENTION

An object of the present invention is to provide an optical receiver having an optical coupler means that can be relatively simply manufactured in integrated wave guide technology in which amplitude noise of an oscillator signal of a local oscillator (when used) is largely supressed.

This and other objects of the invention are achieved in an optical receiver having a coupler means as the receiver of the invention in the form of a specific 90 degree hybrid, wherein a phase shift between a first two mixed signal components and a phase shift between a second two mixed signal components amounts to approximately 180 degrees. Two compensating amplifiers of an electronic amplifier portion form what is referred to as a "balanced receiver". In this regard, see the Journal of Lightwave Technology LT-3, 1985, pages 1110–1122. Accordingly, in its most basic form the receiver of the invention is essentially the combination of an optical 90 degree hybrid with a "balanced receiver", this combination being new.

An advantageous development of the present receiver is that a final control element is provided to set the phase shift between the first two and the second two mixed signal components. A regulating means which continuously samples the phase difference and regulates or controls the final control element is also provided. In this embodiment, the 90 degree phase difference between the first two mixed signal components and the second two mixed signal components at the output at the optical 90 degree hybrid are reliably guaranteed by this monitoring or follow-up arrangement. Thermal and mechanical influences can be compensated with appropriate selection of the control dynamics and control speed in the arrangement.

A preferred embodiment of the regulating means which exploits an intermediate frequency between the frequency of the transmission signal and the frequency of a local oscillator is provided by a band pass filter feeding a multiplier in the regulating means and having an output connected to a low pass filter so that the output of the low pass filter provides the controlling variable to the final control element.

In a further development, the final control element is arranged in the optical coupler itself.

For synchronization of the intermediate frequency, which is not critical and is capable of being realized at a low follow-up or monitoring rate, for example, such as digitally, the output signal of one of the two compensating amplifiers is supplied via a band-pass filter to a frequency discriminator which adjusts the optical frequency of the local oscillator, when used. Such an apparatus is known, for example, from the afore-mentioned reference, IEE Colloquium on Advances in Coherent Optic Devices and Technologies.

An advantageous, concrete development of the optical coupler means of the present receiver is provided by an optical coupler means with first and second couplers at an input side of the coupler means each having one input and two output ports, and third and fourth couplers at an output side of the coupler means each having two inputs and two outputs. In addition a phase shifter is provided in the optical coupler means. An optical fiber 90 degree hybrid device having all the features of the coupler means just described is disclosed in the paper TUB 5 OFC-83, New Orleans. In the known hybrid, both couplers at the input side, as well as the couplers at the output side are formed as fiber-optic directional couplers. It is recognized that a coupler means as disclosed is especially suitable for use in the receiver of the present invention.

Advantageous developments are provided by the preferred embodiments of the present coupler. In particular, it is especially recommendable to realize the coupler means as an integrated coupler in planar technology in order to observe the optical path lengths once defined in the structure of this device with optimum precision. Since the 90 degree phase shift corresponds to one-fourth of the wave length of the light conducted in the wave guides, the differences of the optical path lengths must be kept to a small fraction of the wave length. Thus, the planar integration permits the necessary close observation of the path lengths.

Setting of the 90 degree phase difference can ensue in various ways in the coupler means. The coupler means can be fashioned in a substrate of electro-optical or magneto-optical material. In this case, the 90 degree phase difference can be set or varied by electrical or magnetic fields so that a new, adjustable coupler is provided. This is especially suitable for the afore-mentioned follow-up or monitoring of the phase difference.

It is, therefore, expedient that the phase shifter be composed of an electro-optical or magneto-optical phase modulator. When the phase difference is to be permanently set, the propagation constant of the light in the underlying waveguide section is slightly modified, for example, by applying to or etching off a dielectric cover layer over one of the waveguides until a desired phase difference relative to the other waveguide is reached. Fundamentally, this phase difference can also be achieved in waveguides in which the propagation constant of the light is identical, yet the lengths thereof differ. In the present case, the phase shift function is realized by the applied or etched off dielectric cover layer or by the length difference.

Manufacturing the coupler means in planar technology is especially recommendable since low drift and high stability in the optical hybrid are obtained. It is possible, for example, to produce, the waveguides by ion exchange in glass or by indiffusion of titanium in $LiNbO_3$.

In one embodiment, the couplers at both the input side and the output side of the optical coupler means are directional couplers. Instead of directional couplers, however, x-shaped cross-overs can be used, similar to those known from the Journal of Lightwave Technology, LT-3, 1985, pages 635-642. The directional couplers at the input side can also be formed as y-shaped waveguide branches.

Dependent upon the use to which the present invention is put, the directional couplers at the input side of the optical coupler means may have asymmetrical division ratios. In contrast to, the couplers at the output side preferrably have a division ratio of 1:1. In otherwords, the output couplers are expediently formed as 3-dB couplers.

When the present receiver is used as a homodyne receiver, the division ratios of the directional couplers at the input side of the coupler means are optimized in accordance with the data rate of the modulated signal and with the phase noise of the lasers employed. In this regard, see the Journal of Lightwave Technology, LT-3 (1985), pages 1238-1247.

When the present receiver is used as a multi-port receiver, the division ratios of the two couplers at the input side preferrably amount to exactly 1:1 so that they are 3-dB couplers.

In one development, the phase shifter in the coupler means is arranged between an arbitrary output part of a coupler at the input side and the allocated input part of an appertaining coupler at the output side.

The optical receiver of the invention in various embodiments, for example, can be used as an ASK multi-port receiver, a PSK homodyne receiver or, a DPSK heterodyne receiver.

BRIEF DESCRIPTION OF THE DRAWINGS

FIG. 1 is a schematic circuit diagram of an optical receiver according to the principles of the present invention in use as a PSK homodyne receiver;

FIG. 2 is a schematic circuit diagram of the optical receiver used as a DPSK heterodyne receiver;

DESCRIPTION OF THE PREFERRED EMBODIMENTS

Figure 3:
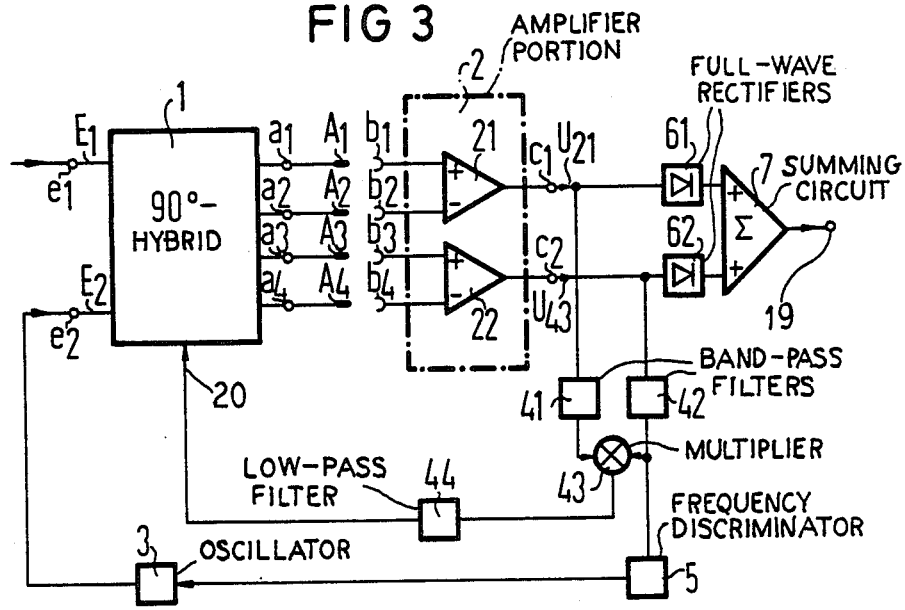
FIG. 3 is a schematic circuit diagram of the present optical receiver used as an ASK multi-port receiver.

The present optical receiver can be used as a PSK homodyne receiver, a DPSK heterodyne receiver or an ASK multi-port receiver as shown in the figures. Critical parts of each of the receivers shown in FIGS. 1 through 3 are a 90 degree hybrid member 1 and an electronic amplifier portion 2 which includes compensating amplifiers 21 and 22. The compensating amplifiers 21 and 22 are in the form of differential amplifiers and together with their respective optical detectors $b_1$ to $b_4$, form what is known as a "balanced receiver".

Referring particularly to FIG. 1, transmission signal $E_1$ is coupled at a first input $e_1$ of the 90 degree hybrid element 1, while an oscillator signal or other reference signal $E_2$ from a local oscillator 3 is provided at a second input $e_2$ of the hybrid element 1. In the case of the receiver of FIG. 1, the transmission signal $E_1$ is a PSK signal. In the case of the receivers shown in FIGS. 2 and 3, the transmission signal $E_1$ is a DPSK signal and an ASK signal, respectively.

The 90 degree hybrid element 1 functions so that the transmission signal $E_1$ and the oscillator signal $E_2$ are mixed in two optical couplers so that four mixed signal components $A_1$, $A_2$, $A_3$ and $A_4$ of the two generated mixed signals are output in parallel at output ports $a_1$, $a_2$, $a_3$, $a_4$, respectively. The resulting signals components $A_1$ and $A_2$ are phase shifted by 180 degrees relative to one another, and the second two mixed signal components $A_3$ and $A_4$ are likewise phase shifted by 180 degrees relative to one another. The first two mixed signal components $A_1$ and $A_2$ are phase shifted by 90 degrees in comparison to the second two mixed signal components $A_3$ and $A_4$.

Thereafter the mixed signal components $A_1$ through $A_4$ are supplied to respective opto-electrical detectors $b_1$, $b_2$, $b_3$, and $b_4$ respectively, where they are converted into corresponding electrical signals. The electrical signals which correspond to the mixed signal components $A_1$ and $A_2$ are conducted to the differential inputs of the differential amplifier 21, whereas the electrical signals corresponding to the mixed optical signal components $A_3$ and $A_4$ are conducted to the differential inputs of the second differential amplifier 22. This arrangement enables the DC signals derived from the transmission signal $E_1$ and the oscillator signal $E_2$ to path-compenstate at outputs $c_1$ and $c_2$ of the amplifiers 21 and 22. The i-f (intermediate frequency) signals derived from the product terms of the field strengths of the transmission signal $E_1$ and the oscillator signal $E_2$ are preserved. Output signals $U_{21}$ and $U_{43}$ on the respective outputs $c_1$ and $c_2$ are phase shifted by 90 degrees relative to one another. In the case of the homodyne receiver shown in FIG. 1, moreover, the radian frequency of the i-f signals is 0.

For the homodyne receiver of FIG. 1, the structure and function of the elements following the outputs $c_1$ and $c_2$ of the amplifier portion 2 which lead to a data output and which are connected to an input of the local oscillator 3 are known from the Journal of Lightwave Technology, LT-3 (1985), pages 1238-1247, which is incorporated by reference herein, and shall not be discussed in detail here. A time delay 8 is connected at the output $c_2$ supplying a multiplier 9. One output of the multiplier 9 is fed through a band-pass filter 10 and to an amplifier 11 before reaching a control input of the voltage-controlled local oscillator 3. The other output of the multiplier 9 is connected to the output $c_1$ to form a data output 12.

In FIG. 2, a DPSK heterodyne receiver is shown having the 90 degree hybrid 1 and electronic amplifier 2 connected in the same way as shown in FIG. 1. The reference signal $E_2$ at the input $e_z$ is from a local oscillator. Circuit elements connected at the outputs $c_1$ and $c_2$ of the amplifier portion 2 are known from Electronics Letters 21 (1985) pages 867–868, incorporated by reference in terms of their structure and function and shall therefore likewise not be discussed in detail here. Time delays 13 and 14 are connected in branches extending from the outputs $c_1$ and $c_2$, respectively, and are mixed back in by multipliers 15 and 16. The outputs of the multipliers 15 and 16 are connected to the inputs of a summing circuit 17, which has an output 18 forming a data output.

An ASK multi-port receiver is shown in FIG. 3. Again, the 90 degree hybrid element 1' and amplifier portion 2 are generally the same as in FIGS. 1 and 2. What is different, however in this example, is that the hybrid 1' is a variable phase hybrid and that the output signals $U_{21}$ and $U_{43}$ of the amplifiers 21 and 22 are rectified by full-wave rectifiers 61 and 62, respectively, and are then summed by a summing means 7. The signal which is thus formed contains the complete transmission signal at a data output 19 and can be subsequently demodulated as in superheterodyne methodology.

The receiver of FIG. 3 also contains a regulating means which regulates the phase difference between the two output signals $U_{21}$ and $U_{43}$ at the outputs $c_1$ and $c_2$ of the respective compensating amplifiers 21 and 22. The phase difference is regulated to a desired phase difference value by a controllable phase modulator found in the 90 degree hybrid element 1 upon deviation of the actual value from the desired value. The phase modulator or phase shifter is controlled by a control signal fed to an input 20 on the 90 degree hybrid 1'.

The control signal for the optical phase modulator or shifter in the 90 degree hybrid element 1' is generated from the two output signals $U_{21}$ and $U_{43}$ of the amplifiers 21 and 22. These signals are supplied to a multiplier 43 via band-pass filters 41 and 42 having a center frequency corresponding to the frequency. The multiplier 43 has an output signal integrated up by a low pass filter 44, the output of which is supplied to the phase modulator or shifter at the input 20 in the 90 degree hybrid element 1'. The phase shifter is adjusted by the control loop to maintain 90 degree phase shift in the optical hybrid. Similarly also the receivers of FIG. 1 and FIG. 2 can be realised with such controllable 90 degree optical hybrid.

For synchronization of the intermediate frequency, the output signal from one of the two band-pass filters 41 and 42, here the filter 42, is supplied to a frequency discriminator 5 which sets the local oscillator 3 in accordance with the optical frequency. The oscillator 3, in turn, is connected to the input $e_z$ of the hybrid 1'.

Figure 4:
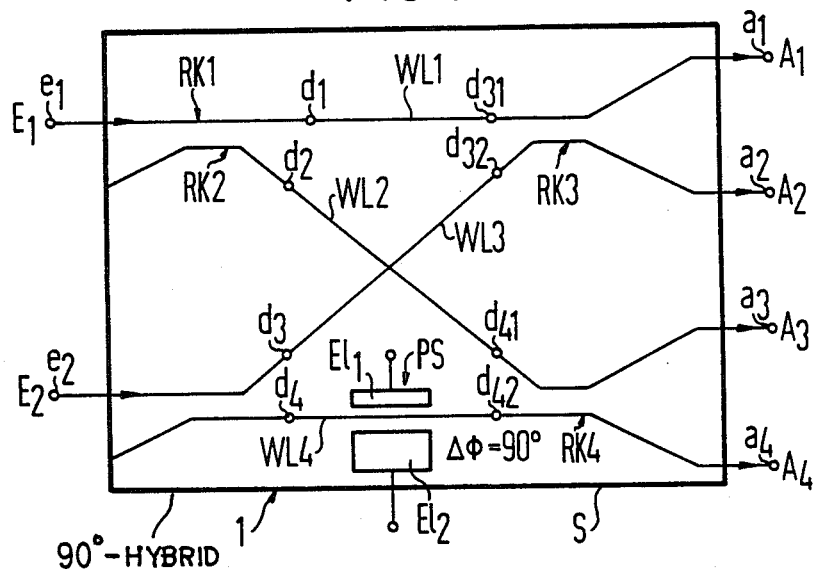
FIG. 4 is a schematic diagram showing the waveguide structure of the 90 degree hybrid element from FIGS. 1 through 3.

With reference now to FIG. 4, an examplary internal structure of the variable hybrid 1' suited for use as a 90 degree hybrid for use in the above described receivers is shown. Four optical directional couplers RK1, RK2, RK3, and RK4 are integrated on a surface of a substrate S, for example, of $LiLbO_3$, wherein the surface of the substrate S lies in the plane of the drawing FIG. 4. The directional couplers RK1 through RK4 are connected to one another in a specific way by waveguides WL1, WL2, WL3, and WL4. The waveguides of the directional couplers RK1 through RK4 and the connecting waveguides WL1 through WL4, for example, are of Ti-diffused strip waveguides.

Two left-hand directional couplers RK1 and RK2 form the couplers at the input side of the hybrid element 1', while the right hand directional couplers RK3 and RK4 form the two couplers of the hybrid 1' at the output side thereof. Of the four input ports of the directional couplers RK1 and RK2 at the left hand side, only two ports $e_1$ and $e_2$ are used. The others are not in use.

For example, one output port $d_1$ of the directional coupler RK1 at the left hand side is connected only to an allocated input port $d_{31}$ of the directional coupler RK3 at the output side. This connection is made in the illustrated embodiment by the waveguide WL1. The other output port $d_2$ of the directional coupler RK1 at the input side is connected only to the input port $d_{41}$ of the other directional coupler RK4 at the output side. This connection is made by the waveguide WL2.

Similarly, the waveguide WL3 connects an output port $d_3$ of the second directional coupler RK2 at the input side to the allocated input port $d_{32}$ of the one directional coupler RK3 at the output side. The waveguide WL4 connects the other output port $d_4$ of the other directional coupler RK2 at the input side of the allocated input part $d_{42}$ of the other directional coupler RK4 at the output side.

Let it be pointed out that the connections shown in the preceeding example shown in FIG. 4 are only an example. Connections can also be undertaken in some other way; it is only important that the four output ports $d_1$ through $d_4$ of the couplers RK1 and RK2 at the input side be allocated in a reversably clear fashion to the input ports $d_{31}$, $d_{32}$, $d_{41}$, and $d_{42}$, and that every coupler RK1 and RK2 at the input side be connected to the two couplers RK3 and RK4 at the output side.

A phase modulator or shifter PS influences the phase of light conducted through the waveguide WL4, and is the means by which a 90 degree phase difference, or somether phase difference, is set. In the present case, the phase modulator PS is an electro-optical modulator and is essentially formed of two electrodes $EL_1$ and $EL_2$ arranged at both sides of the waveguide WL4 and applied to the substrate S. The modulator PS is operated by applying a voltage difference across the waveguide WL4 by the input 20. Such modulators are known from the literature.

The phase modulator PS is shown allocated to the waveguide WL4. It can alternately be arranged so that it does not influence the phase of the light guided in the waveguide WL4 but instead is applied to and influences the phase of the light guided in an arbitrary other connecting waveguide WL1 to WL3.

In the case when the receiver of the invention has a phase control, the control signal can be applied to one of the two electrodes of the modulator PS, for example to the electrode $El_1$, as a control voltage from the input 20, whereas the other electrode $El_2$ is applied to ground. As shown in FIGS. 1 and 2, however, a phase modulator is not required in each embodiment as long as a stable 90 degree phase difference of the optical hybrid can be guaranteed.

The output portions of the couplers RK3 and RK4 at the output side form the four outputs $a_1$ through $a_4$ of the hybrid.

Although other modifications and changes may be suggested by those skilled in the art, it is the intention of the inventors to embody within the patent warranted hereon all changes and modifications as reasonably and properly come within the scope of their contribution to the art.

We claim:

1. An optical receiver for receiving a modulated transmission signal and a reference signal, comprising:
   an optical coupler means for mixing the modulated transmission signal supplied to said receiver with the reference signal,
   said optical coupler including means for phase-shifting by 180 degrees relative to one another a first two of a plurality of mixed signal components of a mixed signal mixed in said optical coupler means from said transmission and reference signals, said first two of said plurality of mixed signal components being taken in parallel from said optical coupler means;
   said optical coupler including means for phase-shifting a second two of said plurality of mixed signal components by 180 degrees relative to one another and means for shifting said second two by 90 degrees relative to said first two of said plurality of mixed signal components, said second two of said plurality of mixed signal components being taken in parallel from said optical coupler means;
   means for opto-electrically converting said first two and second two mixed signal components to corresponding first two and second two electrical mixed signal components;
   an electronic amplifier part connected to receive said electrical mixed signal components,
   said electronic amplifier part including first and second compensating amplifiers, said first compensating amplifier connected to receive said first two electrical mixed signal components, said second compensating amplifier connected to receive said second two electrical mixed signal components, said first and second compensating amplifiers including means for compensating out dc components derived from the transmission and reference signals so that said dc components are not present in first and second electrical output signals output by said first add second compensating amplifiers, said first and second compensating amplifiers including means for deriving signal components from a product of field strength of the transmission and reference signals, and derived signal components being present in said first and second electrical output signals phase-shifted by 90 degrees relative to one another.

2. An optical receiver as claimed in claim 1, wherein said means for shifting said second two mixed signal components by 90 degrees is
   a final control element in said optical coupler means to set the 90 degree phase shift between said first two mixed signal components and said second two mixed signal components;
   a regulating means for continuously sampling a phase difference between said first and second electrical output signals of said first and second compensating amplifiers to regulate the phase difference to a desired value of 90 degrees upon deviation of an actual value from the desired value by said final control element.

3. An optical receiver as claimed in claim 2, further comprising:
   first and second band-pass filters connected to receive respective ones of said first and second electrical output signals;
   said regulating means including a multiplier means connected to outputs of said band-pass filters to receive filtered first and second electrical output signals; and
   a low-pass filter connected to intergrate an output signal of said multiplier, said low pass filter having an output connected as a controlling variable to said final control element.

4. An optical receiver as claimed in claim 3, further comprising:
   a frequency discriminator connected to an output of said first band-pass filter to receive an output signal from said first compensating amplifier through said first band-pass filter; and
   a local oscillator connected at an output of said frequency discriminator for supplying the reference signal which is frequency adjustable depending on an output of said frequency discriminator.

5. An optical receiver as claimed in claim 2, wherein said final control element is arranged in said optical coupler means.

6. An optical receiver as claimed in 5, wherein said final control element is a phase shifter composed of an electro-optical phase modulator.

7. An optical receiver as claimed in claim 5, herein said final control element is a phase shifter composed of a magneto-optical phase modulator.

8. An optical receiver as claimed in claim 1, wherein said optical coupler means includes
   first and second couplers at an input side of said optical coupler means, each of said first and second couplers having an input port and two output ports;
   said optical coupler means including a phase shifter;
   four optical waveguides connecting respective ones of said output ports of said first and second couplers at said input side to respective ones of said input ports of said third and fourth couplers at said output side;
   said phase shifter being arranged between one of said output ports of said second coupler at said input side and a respective input port of said fourth coupler at said output side;
   said input port of said first coupler being connected to receive the transmission signal;
   said input port of said second coupler being connected to receive the reference signal; and
   said output ports of said third and fourth couplers supplying said mixed signal components.

9. An optical receiver as claimed in claim 8, wherein said third and fourth couplers at said output side each have a division ratio of approximately 1:1.

10. An optical receiver as claimed in claim 8, wherein said third and fourth couplers at said output side are each formed as an x-shaped waveguide crossing.

11. An optical receiver as claimed in claim 8, wherein said first and second couplers at said input side are each formed as optical directional couplers.

12. An optical receiver as claimed in claim 8, wherein said first and second couplers at said input side are each formed as x-shaped waveguide crossings.

13. An optical receiver as claimed in claim 8, wherein said first couplers at said input side are each formed as a Y-shaped waveguide branching.

14. An optical receiver as claimed in claim 8, wherein said optical coupler means is integrated in planar technology.

15. An optical receiver as claimed in claim 14, wherein at least one of said couplers and said optical waveguides are formed by ion exchange in a substrate of glass.

16. An optical receiver as claimed in claim 14, wherein at least one of said couplers and said waveguides are formed in an electro-optical substrate.

17. An optical receiver as claimed in claim 14, wherein at least one of said couplers and said waveguides are formed in a magneto-optical substrate.

18. An optical receiver as claimed in claim 8, wherein said first and second couplers at said input side each have a division ratio of approximately 1:1.

19. An optical receiver as claimed in claim 1, wherein said optical coupler means includes a coupler at an output side in the form of an optical directional coupler.

20. An optical receiver as claimed in claim 1, wherein said transmission signal mixed by said optical coupler means is an ASK transmission signal for multiport receiver operation.

21. An optical receiver as claimed in claim 1, wherein said transmission signal mixed by said optical coupler means is a PSK transmission signal for homodyne receiver operation.

22. An optical receiver as claimed in claim 1, wherein said transmission signal mixed by said optical coupler means is a DPSK signal for heterodyne receiver operation.

* * * * *